(12) United States Patent
Kawahito

(10) Patent No.: US 8,284,481 B2
(45) Date of Patent: Oct. 9, 2012

(54) OBJECTIVE LENS, NOSEPIECE AND INVERTED MICROSCOPE EQUIPPED THEREWITH

(75) Inventor: Takashi Kawahito, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/636,572

(22) Filed: Dec. 11, 2009

(65) Prior Publication Data
US 2010/0091363 A1    Apr. 15, 2010

Related U.S. Application Data

(63) Continuation of application No. PCT/JP2008/063088, filed on Jul. 15, 2008.

(30) Foreign Application Priority Data

Jul. 20, 2007  (JP) .................................. 2007-189096

(51) Int. Cl.
G02B 21/00 (2006.01)
(52) U.S. Cl. .......................... 359/368; 359/381; 359/821
(58) Field of Classification Search .................... 359/381
See application file for complete search history.

(56) References Cited

U.S. PATENT DOCUMENTS 6,128,128 A * 10/2000 Otaki et al. .................... 359/381
7,589,839 B2 * 9/2009 Kawano et al. ............... 356/417
2004/0174589 A1 * 9/2004 Kinoshita et al. ............. 359/383
2006/0164721 A1 * 7/2006 Uhl et al. ...................... 359/368

FOREIGN PATENT DOCUMENTS

| JP | 11-038326 A | 2/1999 |
| JP | 2003-021772 A | 1/2003 |
| JP | 2003-029162 A | 1/2003 |
| JP | 2003-043373 A | 2/2003 |
| JP | 2003-090960 A | 3/2003 |
| WO | WO 2005096059 A1 * | 10/2005 |

OTHER PUBLICATIONS

International Preliminary Report on Patentability from parent PCT Appln. No. PCT/JP2008/063088. Date of Mailing: Feb. 18, 2010.

* cited by examiner

Primary Examiner — Lee Fineman
(74) Attorney, Agent, or Firm — Miles & Stockbridge P.C.

(57) ABSTRACT

An objective lens to be fitted into a fitting hole of a nosepiece of a microscope includes an imaging lens that is composed of a plurality of lens groups, and a lens barrel that holds the imaging lens. The lens barrel is formed with a fitting portion that is fitted to the fitting hole of the nosepiece and provided at an outer circumference of a tip portion side away by a given distance from the tip portion where a first lens group in the imaging lens is held, and a mount surface that comes into contact with a contact surface of the fitting hole of the nosepiece upon fitting at the fitting portion. The nosepiece is equipped with the objective lens. The inverted microscope is equipped with the nosepiece fitting the objective lens.

7 Claims, 3 Drawing Sheets

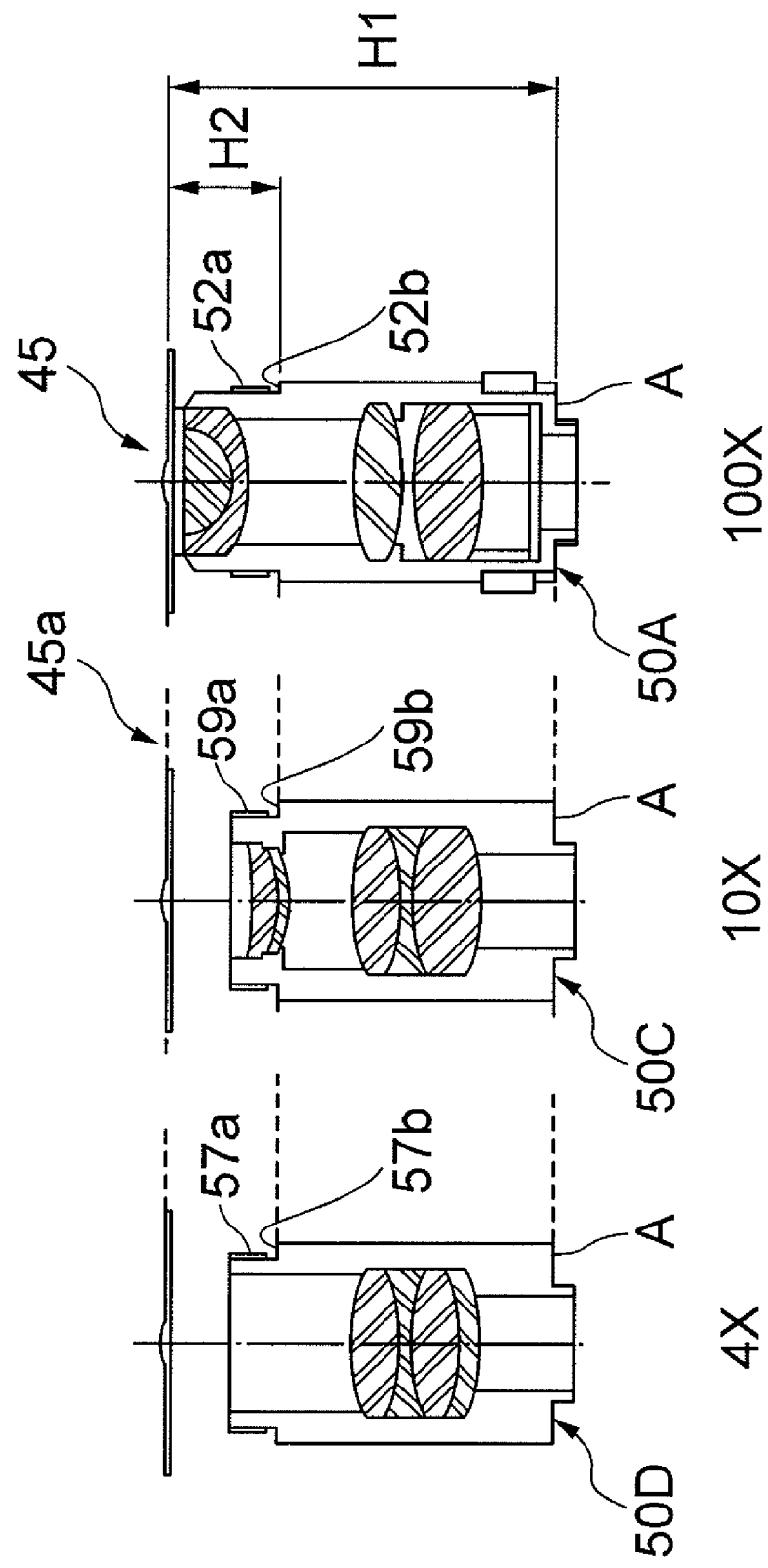

OBJECTIVE LENS, NOSEPIECE AND INVERTED MICROSCOPE EQUIPPED THEREWITH

CROSS-REFERENCE TO RELATED APPLICATION

This application is a continuation of International Application No. PCT/JP2008/063088 filed Jul. 15, 2008.

TECHNICAL FIELD

The present invention relates to an objective lens, a nosepiece and an inverted microscope equipped therewith.

BACKGROUND ART

In a conventional inverted microscope, a plurality of objective lenses, a nosepiece holding these objective lenses, and a nosepiece holder that is fixed to a stage and holds the nosepiece through a supporting member are disposed under the stage (see Japanese Patent Application Laid-Open No. 11-38326).

A rack and pinion mechanism is provided between the nosepiece holder and the supporting member. With rotating a focusing knob provided on the nosepiece holder, the objective lens selectively provided on the optical path can be moved up and down so as to focus on a sample. The distance between the objective lens and the stage has to be kept to a distance between the objective lens and the sample upon focusing on the sample.

DISCLOSURE OF THE INVENTION

When an environment temperature of the microscope goes up by heat from a light source or a power source installed in the microscope or by using an air-conditioner, a distance between the objective lens and the stage may be varied by thermal expansion of the lens barrel of the objective lens held by a nosepiece resulting in focus shifting. When the focus shifting exceeds the depth of focus of the objective lens, it becomes impossible to obtain a clear image.

The present invention is made in view of aforementioned problems, and has an object to provide an objective lens and a nosepiece capable of reducing focus shift caused by thermal expansion of the lens barrel of the objective lens, and an inverted microscope equipped therewith.

In order to solve the problems, according to a first aspect of the present invention, there is provided an objective lens to be fitted into a fitting hole of a nosepiece of a microscope comprising: an imaging lens that is composed of a plurality of lens groups; and a lens barrel that holds the imaging lens; the lens barrel being formed with a connecting portion that is to be connected to the fitting hole of the nosepiece, at an outer circumference of a tip portion side away by a given distance from the tip portion where a first lens group in the imaging lens is held, and with a mount surface that comes into contact with a contact surface of the fitting hole of the nosepiece upon connecting at the connecting portion.

In the first aspect of the present invention, it is preferable that the fitting portion has a fitting mechanism comprising a screw fixation or a bayonet mount.

In the first aspect of the present invention, it is preferable that the fitting mechanism of the fitting portion comprises a female screw formed on the fitting hole of the nosepiece and a male screw formed on the outer circumference.

In the first aspect of the present invention, it is preferable that when a plurality of objective lenses having different magnifications or numerical apertures are fitted to the nosepiece, the male screw of each objective lens is formed on the outer circumference with adjusting a given distance from the tip portion so as to resolve variation in parfocality.

In the first aspect of the present invention, it is preferable that the lens barrel is made from an invar-type material with a low thermal-expansion coefficient.

According to a second aspect of the present invention, there is provided a nosepiece equipped with the objective lens according to the first aspect, wherein the female screw is a through hole through which the tip of the objective lens can be protruded.

According to a third aspect of the present invention, there is provided an inverted microscope equipped with the objective lens according to the first aspect and the nosepiece according to the second aspect.

According to the present invention, it becomes possible to reduce focus shift caused by thermal expansion of a lens barrel of an objective lens.

BRIEF DESCRIPTION OF THE DRAWINGS

FIGS. 3A, 3B and 3C are diagrams showing a relation between objective lenses and parfocality, and respectively show 4×, 10× and 100× objective lenses.

EMBODIMENT FOR CARRYING OUT THE INVENTION

An embodiment according to the present invention is explained below with reference to accompanying drawings.

Figure 1:
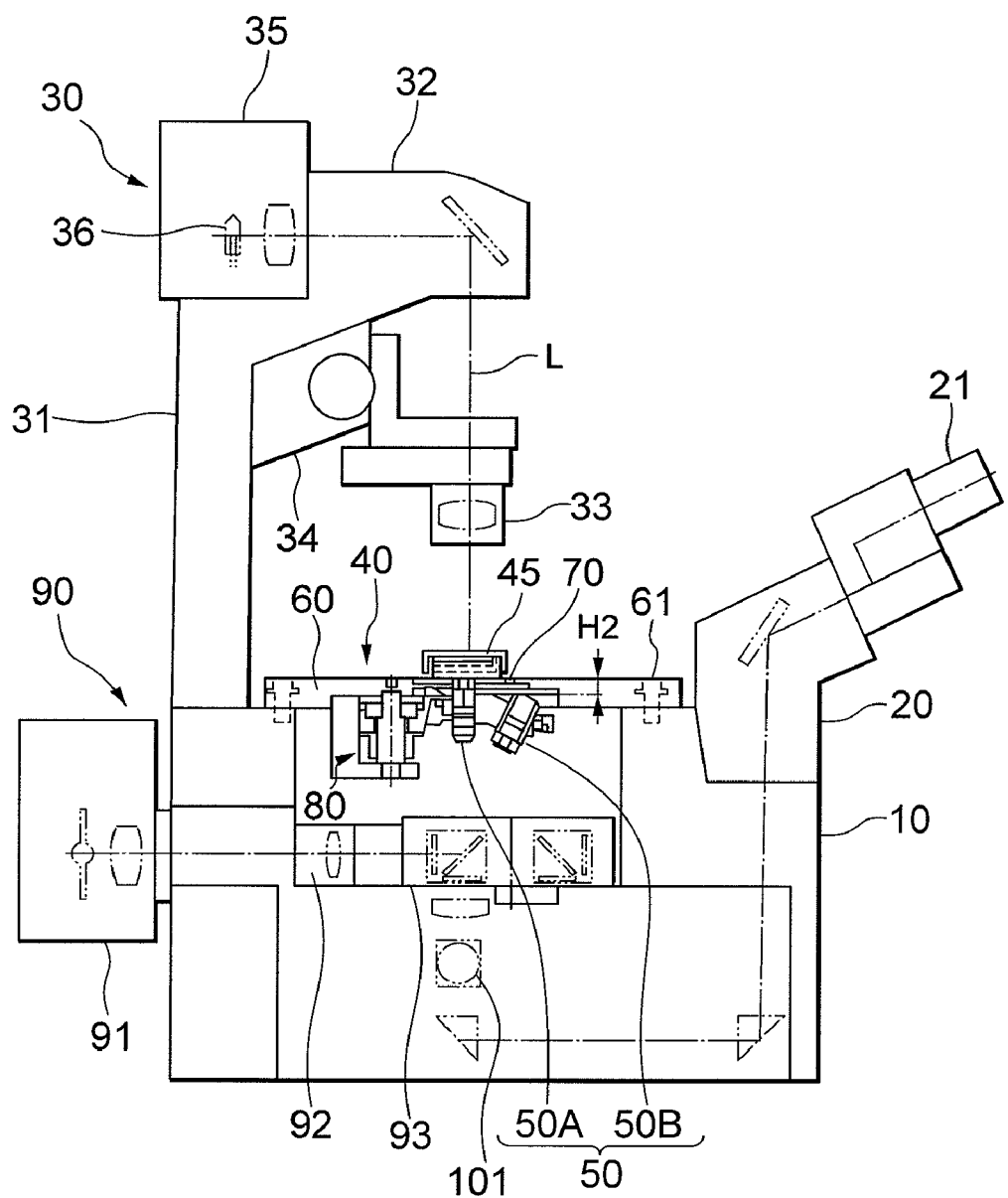
FIG. 1 is a schematic diagram showing an inverted microscope seen from a side according to an embodiment of the present invention.

FIG. 1 is a schematic diagram of an inverted microscope seen from a side according to an embodiment of the present invention.

The inverted microscope includes a microscope main body 10, a lens tube 20, an illumination support 30, and a stage unit 40.

The illumination support 30 is provided on an end of the microscope main body 10.

The illumination support 30 is composed of a vertical portion 31 and a horizontal portion 32 extending horizontally from the upper end of the vertical portion 31. A lamp house 35 is provided on rear side of the upper end of the vertical portion 31, and a condenser lens 33 is provided on the horizontal portion 32 through a mounting portion 34. In the lamp house 35, such as a halogen lamp 36 is installed.

An epi-illumination fluorescence unit 90 for carrying out epi-illumination fluorescence observation is provided on rear side of the lower end of the illumination support 30. The epi-illumination fluorescence unit 90 is equipped with a lamp house 91, an epi-illumination fluorescence device 92 and a filter unit 93. In the lamp house 91, such as a mercury lamp is installed.

On the other end of the microscope main body 10, the lens tube 20 is provided, and an eyepiece 21 for enlarging an image formed by an objective lens 50 to be seen by a naked eye is provided on the lens tube 20.

The stage unit 40 includes a stage 60 on which a sample 45 is placed, a nosepiece 70 that holds a plurality of different kind of objective lenses 50A, 50B and selectively disposes any one of objective lenses 50A, 50B on the optical axis L by rotation, and a focusing mechanism 80 that moves the selected one of objective lenses 50A, 50B along the optical axis L. The stage 60 is fixed to the microscope main body 10 by a screw 61. The nosepiece 70 and the focusing mechanism 80 are disposed under the stage 60. A prism 101 is disposed in the microscope main body 10.

Figure 2:
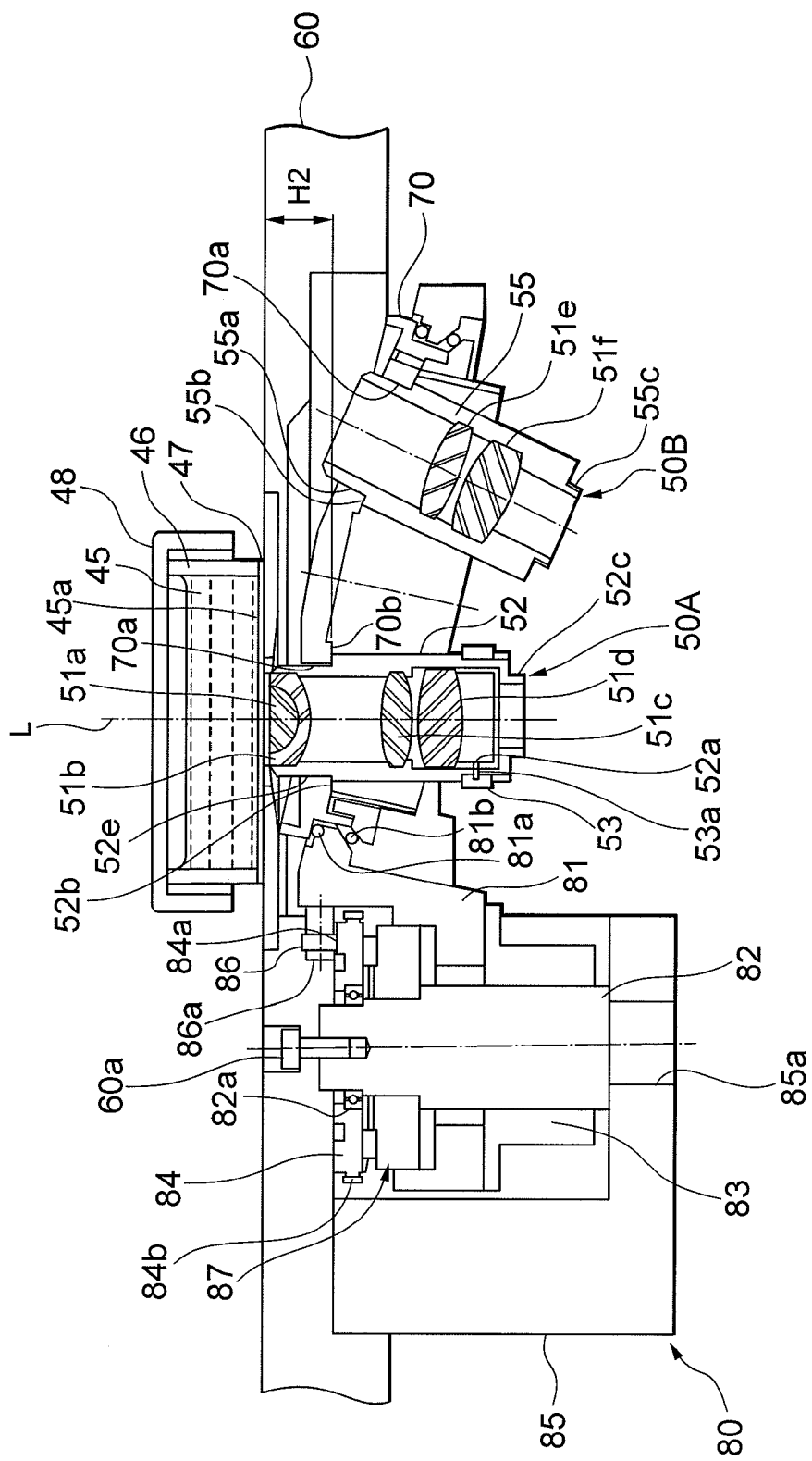
FIG. 2 is a partially enlarged diagram of FIG. 1.

FIG. 2 is a partially enlarged view of FIG. 1.

The sample 45 is a culture solution stored in a petri dish 46. The petri dish 46 has a cylindrical shape. A cover glass 47 is stuck to the lower end of the petri dish 46, and a cover 48 is placed on the upper end to prevent various germs from entering. The upper surface of the cover glass 47 is a sample surface 45a.

The objective lens 50A is a high-numerical-aperture objective lens. The objective lens 50A includes lenses 51a through 51d, a lens barrel 52 and a correction ring 53. The correction ring 53 is provided on the outer circumference of the lens barrel 52. An elongate hole (not shown) is formed on the lens barrel 52 so that a pin 53a can move along the optical axis of the objective lens 50A. On the inner circumference of the lens barrel 52, the pin 53 is fixed to the outer circumference of a lens frame 52a for holding the lens 51d, and a helical groove is formed on the inner circumference of the correction ring 53. The pin 53a can slide along the groove on the inner circumference of the correction ring 53. Accordingly, when the correction ring 53 is rotated, the lens frame 52a is moved along the optical axis L. The lens 51d is moved in a body with the lens frame 52a along the optical axis L so as to correct aberration caused by a thickness error of the cover glass 47. A male screw 52e for screwing into a female screw 70a of the nosepiece 70 and a barrel-side contact surface (mount surface) 52b for making contact with a nosepiece-side contact surface (contact surface) 70b are formed on the outer circumference of a tip portion of the lens barrel 52. The male screw 52e of the lens barrel 52 screws into the female screw 70a of the nosepiece 70 until the barrel-side contact surface 52b comes into contact with the nosepiece-side contact surface 70b. Incidentally, a male screw 52c is formed on the rear end (an end portion farther from the stage 60) of the lens barrel 52. The lens barrel 52 is made from an invar-type material with a low thermal expansion coefficient. The objective lens 50A can be attached to a conventional nosepiece by the male screw 52c.

The objective lens 50B is a low magnification objective lens. The objective lens 50B includes lenses 51e, 51f, and a lens barrel 55.

A male screw (first male screw) 55a for screwing into a female screw 70a of the nosepiece 70 and a barrel-side contact surface 55b for making contact with a nosepiece-side contact surface 70b are formed on the outer circumference of a tip portion of the lens barrel 55. Incidentally, a male screw (second male screw) 55c is formed on the rear end of the lens barrel 55. The objective lens 50B can be attached to a conventional nosepiece by the male screw 55c.

The female screw 70a of the nosepiece 70 is a through hole that makes each of the tip portions of the objective lenses 50A, 50B protrude from the surface of the nosepiece 70.

A focusing mechanism 80 includes a nosepiece-fixing portion 81, a spline axle 82, a spline bush 83, a cam disc 84, and a block 85.

A portion of the nosepiece-fixing portion 81 holds the nosepiece 70 in a rotatable manner through ball bearings 81a, 81b. Thrust direction of the nosepiece 70 is determined by the upper ball bearing 81a, and radial direction of the nosepiece 70 is determined by the lower ball bearing 81b.

The other portions of the nosepiece-fixing portion 81 are fitted to the spline axle 82 through a spline groove. The nosepiece-fitting portion 81 can be slid along the spline axle 82. The nosepiece-fixing portion 81 is held by the spline bush 83 that is fitted to the spline axle 82.

The lower end of the spline axle 82 is held by a counterbore 85a of the block 85, and the upper end is fixed to the stage 60 by a bolt 60a. The block 85 is fixed to the stage 60.

The nosepiece-fixing portion 81 is provided with an axle 86a that is extended to a direction perpendicular to the optical axis and equipped with a bearing 86 at the tip portion thereof. An outer ring of the bearing 86 rotates in contact with a cam surface 84a formed on upper surface of a cam disc 84 connected to the spline axle 82 through a radial bearing 82a. The height of the cam surface 84a (the height in the optical axis direction) varies along circumferential direction of the cam disc 84. The height of the cam surface 84a in the optical axis direction varies in accordance with rotation of the cam disc 84. An inner ring of the radial bearing 82a is fixed to the spline axle 82.

The lower surface of the cam disc 84 is held by a thrust cylindrical roller bearing unit 87. Accordingly, friction torque upon rotating the cam disc 84 can be reduced, and the cam disc 84 can be rotated smoothly on the spline axle 82. A gear 84b formed on the outer circumference of the cam disc 84 can be rotated by operating an unillustrated knob.

When the cam disc 84 is rotated by operating the knob, the bearing 86 relatively moves on the cam surface 84a in the circumferential direction, and the nosepiece-fixing portion 81 moves up and down. As a result, the nosepiece 70 fixed to the nosepiece-fixing portion 81 moves up and down.

FIGS. 3A, 3B and 3C are diagrams showing a relation between objective lenses and parfocality.

Other than the objective lenses 50A and 50B, objective lenses 50D and 50C can be attached to the nosepiece 70.

Magnifications of the objective lenses 50D, 50C and 50A are 4×, 10× and 100×, respectively. Incidentally, H1 and H2 shown in respective figures denote parfocal lengths.

As shown in FIGS. 3A, 3B, 3C, the heights from an abutting surface A of the objective lenses 50D, 50C and 50A to a barrel-side contact surfaces 57b, 59b and 52b are the same. In other words, male screws 57a, 59a and 52a of the objective lenses having different magnifications or numerical apertures are formed on the outer circumference of tip portion of respective objective lenses so as to resolve variation in parfocality, and fitted to respective female screws 70a of the nosepiece 70 by screw fixation. With configuring in this manner, it becomes possible to save time of refocusing upon changing objective lens with different magnification.

In the present embodiment, since the male screw of the tip portion of the objective lens is held by the nosepiece, even if the lens barrel of the objective lens expands by increase in environmental temperature, an amount of expansion in the optical axis direction of the lens barrel is less than that of a conventional case. As a result, variation in a distance between the objective lens and the stage 60 (a distance between the objective lens and the sample 45) is less than that of a conventional case, so that focus shift can be reduced. When the sample 45 is living cells in particular, environmental temperature becomes easy to be controlled. Moreover, since a male screw is provided at the rear end of the lens barrel, the objective lens 50 can be attached to a conventional nosepiece. Furthermore, since the lens barrel is made from an invar-type material with a low thermal expansion coefficient, the amount of expansion of the lens barrel in the optical axis L direction can be smaller. Moreover, since the female screw 70a of the nosepiece 70 is a through hole capable of making the tip portion of the objective lens protrude the surface of the nosepiece, objective lenses 50A, 50B, 50C and 50D with different magnifications or numerical apertures can be attached to the nosepiece 70.

In the above-described embodiment, although an example that fixing mechanism between the lens barrel of the objective lens and a fitting hole of the nosepiece is a screw fixation is explained, the present embodiment is not limited to this, and, for example, a fixing mechanism such as a bayonet mount can be adopted.

What is claimed is:

1. An objective lens to be fitted into a fitting hole of a nosepiece of a microscope comprising:
   an imaging lens that is composed of a plurality of lens groups; and
   a lens barrel that holds the imaging lens;
   said plurality of lens groups including a first lens group which, when the objective lens is fitted in the fitting hole of the nosepiece and is an observed position, is disposed nearest to a specimen and a second lens group which, when the objective lens is fitted in the fitting hole of the nosepiece and is in an observed position, is disposed farthest from the specimen;
   the lens barrel being formed as a single piece having, as a part thereof, a connecting portion that is to be received in the fitting hole of the nosepiece at a position on an outer circumference of the lens barrel that is closer to an end of the lens barrel nearest to the specimen than to an opposite end of the lens barrel, that is closer to said first lens group than to said second lens group, and having, as a part thereof, a mount surface that is located adjacent to said connecting portion, and that abuts the nosepiece when the connecting portion is received in the fitting hole of the nosepiece.

2. The objective lens according to claim 1, wherein the connecting portion has a fitting mechanism comprising a screw or a bayonet mount.

3. The objective lens according to claim 1, wherein the connecting portion has a fitting mechanism comprising a male screw to be engaged with a female screw formed in the fitting hole of the nosepiece.

4. A nosepiece on which the objective lens according to claim 3 is fitted, wherein the fitting hole of the nosepiece is a through hole formed with a female screw through which a tip of the objective lens toward the specimen can be protruded from a surface of the nosepiece.

5. An inverted microscope equipped with a nosepiece on which the objective lens according to claim 3 is fitted, wherein the female screw is formed at a through hole through which a tip of the objective lens can be protruded.

6. The objective lens according to claim 1, wherein the lens barrel is made from an invar-type material with a low thermal-expansion coefficient.

7. An inverted microscope equipped with a nosepiece on which a selected one of a plurality of objective lenses having different magnifications or numerical apertures is fitted into a fitting hole of the nosepiece, and wherein each objective lens comprises:
   an imaging lens that is composed of a plurality of lens groups; and
   a lens barrel that holds the imaging lens;
   said plurality of lens groups including a first lens group which, when the selected objective lens is fitted in the fitting hole of the nosepiece and is an observed position, is disposed nearest to a specimen and a second lens group which, when the selected objective lens is fitted in the fitting hole of the nosepiece and is in an observed position, is disposed farthest from the specimen;
   the lens barrel being formed as a single piece having, as a part thereof, a connecting portion that is to be received in the fitting hole of the nosepiece at a position on an outer circumference of the lens barrel that is closer to an end of the lens barrel nearest to the specimen than to an opposite end of the lens barrel, that is closer to said first lens group than to said second lens group, and having, as a part thereof, a mount surface that is located adjacent to said connecting portion, and that abuts the nosepiece when the connecting portion is received in the fitting hole of the nosepiece,
   wherein the connecting portion has a fitting mechanism comprising a male screw to be engaged with a female screw formed in the fitting hole of the nosepiece, and wherein positions on the outer circumference of each lens barrel at which the connecting portion and the mount surface are formed, are determined in accordance with the respective objective lenses.

* * * * *